(12) United States Patent
Nagasawa et al.

(10) Patent No.: US 8,047,342 B2
(45) Date of Patent: Nov. 1, 2011

(54) STRUT TYPE SHOCK ABSORBER

(75) Inventors: Takao Nagasawa, Tokyo (JP); Masaru Fukushima, Tokyo (JP); Masahiro Miwa, Tokyo (JP); Taku Sakashita, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 689 days.

(21) Appl. No.: 11/783,478

(22) Filed: Apr. 10, 2007

(65) Prior Publication Data

US 2007/0278726 A1 Dec. 6, 2007

(30) Foreign Application Priority Data

May 30, 2006 (JP) .................................. 2006-149343

(51) Int. Cl.
*F16F 9/00* (2006.01)
(52) U.S. Cl. ................................. 188/321.11
(58) Field of Classification Search ............. 188/321.11, 188/322.19; 267/195; 280/124.154; 29/525.14
See application file for complete search history.

(56) References Cited

U.S. PATENT DOCUMENTS

| 5,009,401 | A | * | 4/1991 | Weitzenhof | 267/64.21 |
| 5,308,032 | A | * | 5/1994 | Ohta | 248/230.2 |
| 5,342,029 | A | * | 8/1994 | Carter | 267/220 |
| 5,730,547 | A | * | 3/1998 | Nogami | 403/384 |
| 5,772,168 | A | * | 6/1998 | Nakazawa et al. | 248/300 |
| 7,022,932 | B2 | * | 4/2006 | Hatakeyama et al. | 219/61 |

FOREIGN PATENT DOCUMENTS

GB 2137730 A * 10/1984
JP 2002-219570 A 8/2002

* cited by examiner

*Primary Examiner* — Bradley King
*Assistant Examiner* — Stephen Bowes
(74) *Attorney, Agent, or Firm* — Rabin & Berdo, PC

(57) ABSTRACT

A strut type shock absorber (1) comprises an outer shell (2) and a knuckle bracket (3). A curved portion (4) of the knuckle bracket (3) positioned in close contact with the outer shell (2) comprises a reinforcing flange (7) formed by bending a part of an axial end of the curved portion (4) outward and a no-flange portion (6), both of which are welded onto the outer shell (2). By setting an axial distance (H) from an inflection start point to an inflection end point of the outer circumferential surface of the reinforcing flange (7) to be equal to an axial distance from the inflection start point to the no-flange portion (6), and by forming an insulation portion (9) between the reinforcing flange (7) and the no-flange portion (6), an effectual welding operation and the prevention of molten metal from flowing over the reinforcing flange (7) during welding are realized.

9 Claims, 3 Drawing Sheets

STRUT TYPE SHOCK ABSORBER

FIELD OF THE INVENTION

This invention relates to a welded construction of a knuckle bracket on an outer shell of a strut type shock absorber.

BACKGROUND OF THE INVENTION

JP2002-219570A, published by the Japan Patent Office in 2002, discloses a strut type shock absorber having a knuckle bracket fixed by welding onto a cylindrical outer shell.

The knuckle bracket comprises a curved portion having an arc-shaped cross-section and positioned in close contact with the outer circumferential surface of the outer shell and a pair of fixing plates projecting laterally in parallel with each other from two circumferential ends of the curved portion. Both axial ends of the curved portion are welded onto the outer shell.

So-called vertical downward welding is applied for the welding, during which the outer shell is retained in a substantially horizontal state, and a torch of an electric-arc welding machine is directed obliquely downward from above to a welding position corresponding to an apex of the circular cross-section of the outer shell. The welding is performed in this state while rotating the outer shell about its center axis.

SUMMARY OF THE INVENTION

In order to increase the structural strength of the knuckle bracket, a reinforcing flange may be formed by bending a part of an axial end of the curved portion outward. As a result, the reinforcing flange and a no-flange portion in which the reinforcing flange is not provided coexist at the axial end of the curved portion.

The reinforcing flange is formed from a projection formed in the axial direction in the curved portion in advance. The projection is then bent outward by around 90 degrees to form the reinforcing flange. If an inflection start point of the reinforcing flange is set equal to the position of the no-flange portion in the axial direction, a step corresponding to the thickness of the projection is inevitably formed between the reinforcing flange and the no-flange portion.

If the knuckle bracket is thus constructed and the reinforcing flange and the no-flange portion are welded continuously onto the outer circumferential surface of the outer shell by vertical downward welding, relative positions of the torch and the outer shell in the axial direction must be altered when the torch passes the step in the course of the welding process. The alteration of the relative positions can be a factor in lowering the operating efficiency of the welding process.

Further, during vertical downward welding of the no-flange portion onto the outer circumferential surface of the outer shell towards the step, molten metal may flow down beyond the step and adhere to a part of the reinforcing flange, thereby spoiling the appearance of the shock absorber.

It is therefore an object of this invention to increase the operation efficiency of a welding process for welding the knuckle bracket onto the outer shell while preventing molten metal from flowing down beyond the boundary between the no-flange portion and the reinforcing flange during the welding process.

In order to achieve the above object, this invention provides a strut type shock absorber comprising a cylindrical outer shell and a knuckle bracket comprising a curved portion which is in close contact with the outer shell.

The curved portion comprises a reinforcing flange formed by bending an axial end of the curved portion outward, a no-flange portion which is a part of the axial end of the curved portion where the reinforcing flange is not formed, and an insulation portion formed on the axial end of the curved portion between the reinforcing flange and the no-flange portion.

The reinforcing flange has an inner circumferential surface welded onto the outer shell, and an outer circumferential surface having an inflection start point and an inflection end point. The no-flange portion is also welded onto the outer shell. An axial distance from the inflection starting point to the inflection end point is set to be equal to an axial distance from the inflection starting point to the no-flange portion.

The details as well as other features and advantages of this invention are set forth in the remainder of the specification and are shown in the accompanying drawings.

DESCRIPTION OF THE PREFERRED EMBODIMENTS

Figure 1:
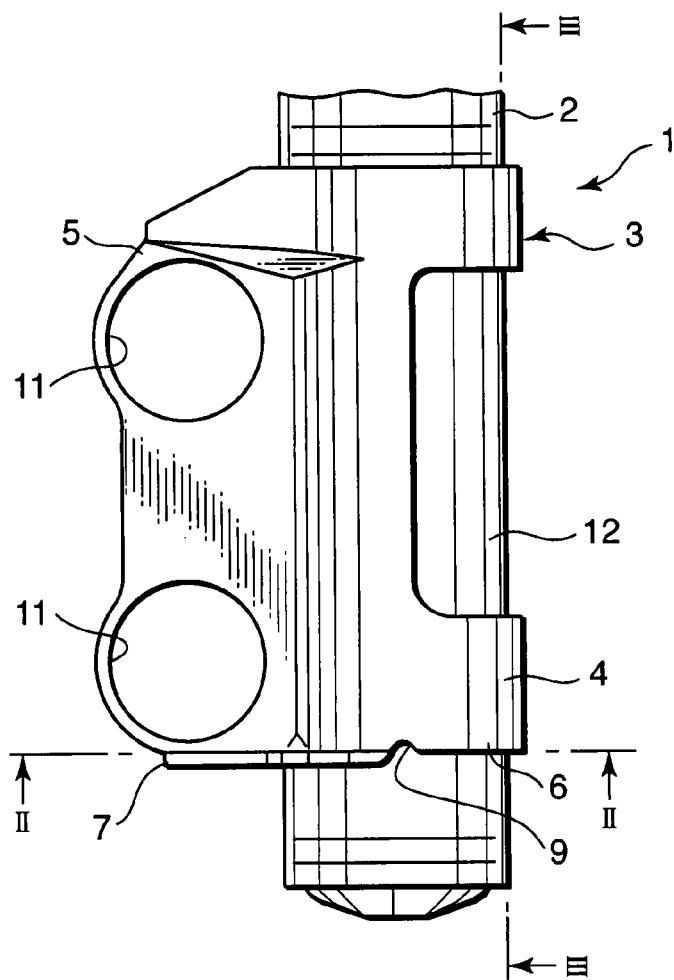
FIG. 1 is a side view of essential parts of an outer shell and a knuckle bracket of a strut type shock absorber according to this invention.

Referring to FIG. 1 of the drawings, a strut type shock absorber 1 for a vehicle comprises a cylindrical outer shell 2 and a knuckle bracket 3 fitted onto the outer shell 2.

The knuckle bracket 3 comprises a curved portion 4 with an arc-shaped horizontal section and positioned in close contact with an outer circumference of the outer shell 2 and a pair of parallel fixing plates 5 extending laterally in a perpendicular direction to the outer shell 3 from both circumferential ends of the curved portion 4 for joining a knuckle arm. The curved portion 4 and the pair of fixing plates 5 are formed integrally by bending a sheet metal of a predetermined shape.

A reinforcing flange 7 is provided at an axial end of the curved portion 4 near the bottom of the outer shell 2, or in other words the lower end of the curved portion 4, when the shock absorber 1 is an operational state. The reinforcing flange 7 is also provided on the fixing plates 5 continuously with the reinforcing flange 7 of the curved portion 4.

Figure 2:
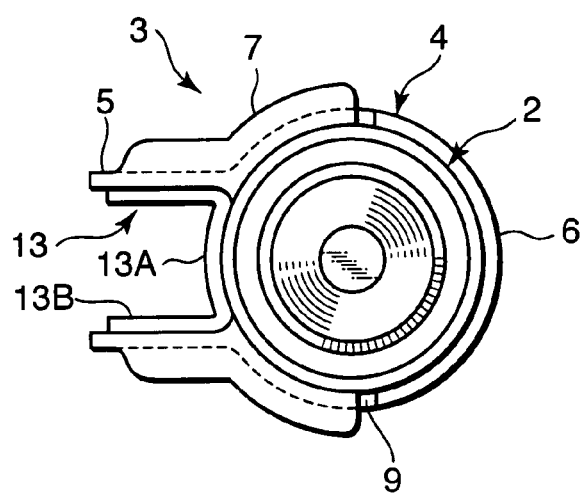
FIG. 2 is a bottom view of the outer shell and the knuckle bracket seen along the line II-II in FIG. 1.

Referring to FIG. 2, the reinforcing flange 7 is formed by bending the lower end of the curved portion 4 outward for about 90 degrees, except for a part thereof in an approximately 180 degrees region on the opposite side of the fixing plates 5 and the lower end of the fixing plates 5. The approximately 180 degrees region of the lower end of the curved portion 4 is named as a no-flange portion 6.

An arc-shaped cutout 9 is formed between the reinforcing flange 7 bent outward and the no-flange portion 6 as an insulation part.

The knuckle bracket 3 further comprises an inner bracket 13 disposed between the pair of fixing plates 5. The inner bracket 13 comprises a second curved portion 13A and a pair of inner plates 13B extending laterally from both circumferential ends of the curved portion 13A so as to overlap the pair of fixing plates 5 on the inner side thereof.

Referring again to FIG. 1, a pair of bolt holes 11 aligned vertically are formed through the fixing plates 5 and the inner plate 13B so as to fix a knuckle arm.

Figure 3:
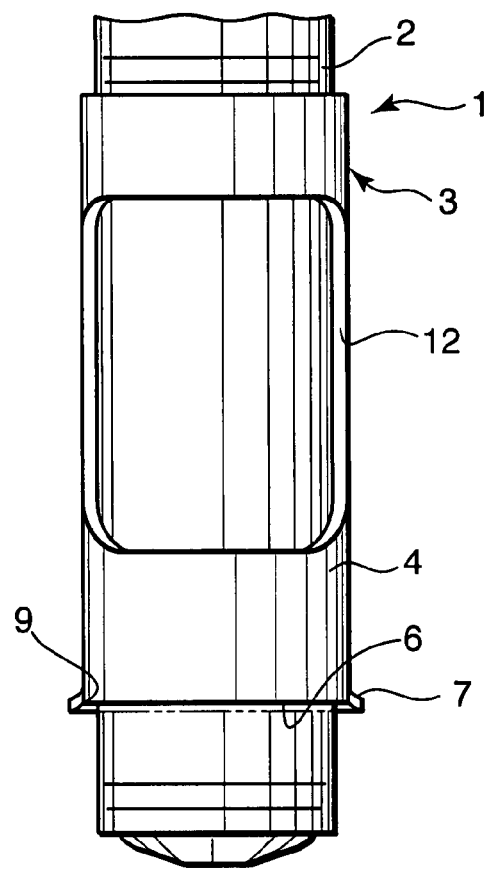
FIG. 3 is a side view of the outer shell and the knuckle bracket seen along the line III-III in FIG. 1.

Referring to FIG. 3, a window-shaped cutout 12 is formed in the curved portion 4 on the opposite side of the fixing plates 5 for the purpose of weight saving.

Figure 4:
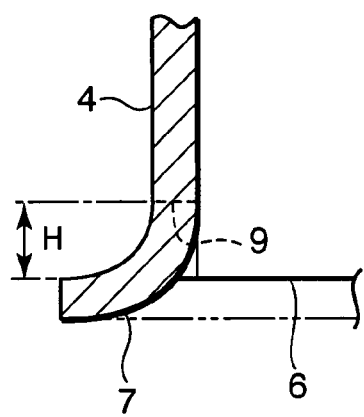
FIG. 4 is an enlarged vertical sectional view of essential parts of the knuckle bracket, illustrating relative positions of a reinforcing flange and a no-flange portion according to this invention.
Figure 5:
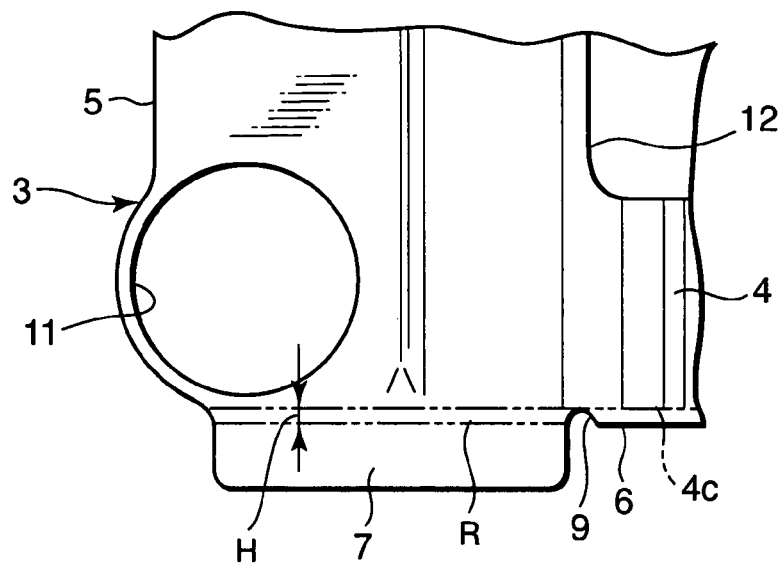
FIG. 5 is an enlarged side view of essential parts of the knuckle bracket, illustrating a shape of the reinforcing flange before undergoing a bending process.

Referring next to FIGS. 4 and 5, the relative locations and dimensions of the reinforcing flange 7, the no-flange portion 6, and the cutout 9 will be described.

Referring to FIG. 4, a distance from an inflection start point to an inflection end point of the outer circumferential surface of the reinforcing flange 7 is assumed to be H. It should be noted that the inflection end point is located on a rear surface of the reinforcing flange 7, not a front surface thereof.

Referring to FIG. 5, the reinforcing flange 7 before undergoing a bending process takes the form of a projection projecting greatly in the axial direction with respect to the no-flange portion 6. The length of the projection corresponding to the vertical length of the reinforcing flange 7 in the figure may be set arbitrarily.

The position of the no-flange portion 6 in the axial direction is set to be equal to that of the inflection end point of the outer circumferential surface of the reinforcing flange 7. In other words, the position of the no-flange portion 6 in the axial direction is set at a point where the distance from the inflection start point of the outer circumference of the reinforcing flange in the axial direction becomes equal to the distance H.

The cutout 9 is formed at a boundary between the no-flange portion 6 and the reinforcing flange 7. The depth of the cutout 9 is determined such that the bottom of the cutout 9 corresponds to the inflection start point of the outer circumference of the reinforcing flange 7, or in other words such that the distance between the bottom of the cutout 9 and the no-flange portion 6 in the axial direction is equal to the distance H. The depth of the cutout 9 may however be made slightly deeper than this depth.

Figure 6:
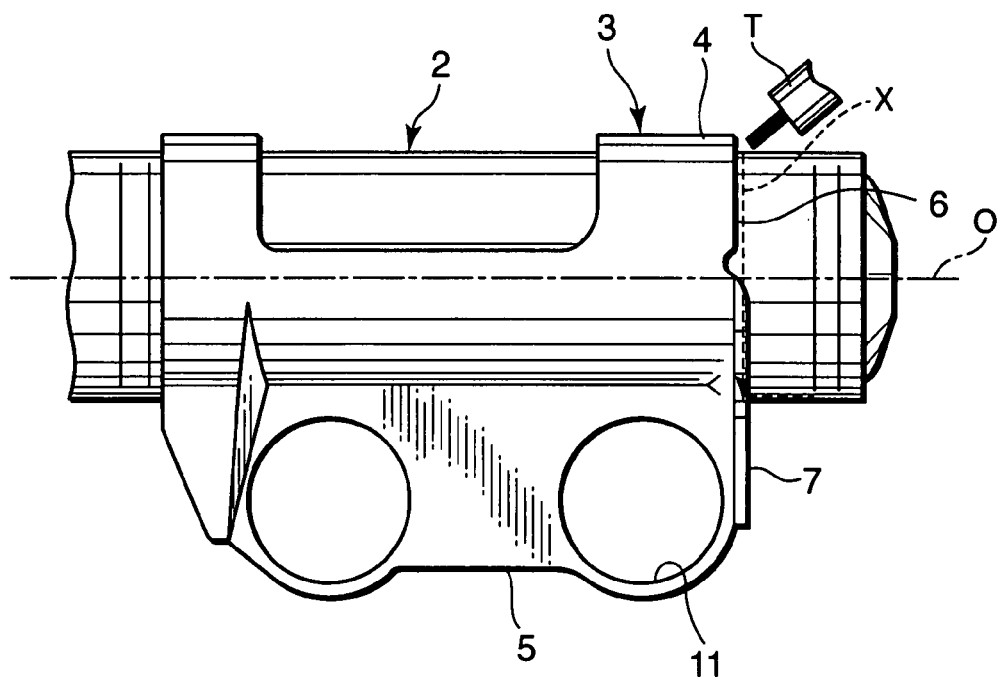
FIG. 6 is a side view of essential parts of the outer shell and the knuckle bracket, illustrating a welding process for welding the knuckle bracket onto the outer shell.

Referring to FIG. 6, according to this arrangement, when the knuckle bracket 3 is welded onto the outer shell 2, the welding position of the no-flange portion 6 onto the outer circumferential surface of the outer shell 2 and the welding position of the inner circumferential surface of the reinforcing flange 7 onto the outer circumferential surface of the outer shell 2 are aligned at a substantially identical distance from the inflection start point in the axial direction, and hence a weld seam X created by a torch T forms a substantially straight line as specified in the figure.

In order to weld the knuckle bracket 3 onto the outer shell 2 by vertical downward electric-arc welding, the outer shell 2 is first inserted into a space delimited by the curved portion 4 and the second curved portion 13A of the knuckle bracket 3.

Next, as shown in FIG. 6, the outer shell 2 is placed horizontally, and welding of the no-flange portion 6 onto the outer circumferential surface of the outer shell 2 and welding of the inner circumferential surface of the reinforcing flange 7 onto the outer circumferential surface of the outer shell 2 are performed consecutively while rotating the outer shell 2 about a center axis O.

Since the welding positions of these members are previously arranged along the weld seam X in FIG. 6, there is no need to vary the relative locations of the torch T and the shock absorber 1 in the axial direction before and after the torch T passes the cutout 9. The welding process can therefore be performed in the same position for the entire circumferential welding path.

As a result, the welding of the knuckle bracket 3 onto the outer shell 2 is accomplished with a high efficiency. Further, when welding is started at the no-flange portion 6, molten metal may flow down from the no-flange portion 6 towards the reinforcing flange 7, but the molten metal is trapped in the cutout 9, and hence prevented from reaching the reinforcing flange 7. The cutout 9 thus prevents the molten metal that flows down from the no-flange portion 6 from adhering to the reinforcing flange 7 and spoiling the appearance of the welded part.

Forming the cutout 9 between the reinforcing flange 7 and the no-flange portion 6 is also preferable in view of preventing a bending force from acting on the no-flange portion 6 during the bending process of the reinforcing flange 7.

The contents of Tokugan 2006-149343, with a filing date of May 30, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiment described above, the reinforcing flange 7 is provided at the lower end of the curved portion 4 and the fixing plates 5 in the operational state of the shock absorber, but this invention is applicable to a shock absorber in which the reinforcing flange is provided at the upper end of the curved portion 4 and the fixing plates 5 in the operational state of the shock absorber. Further, this invention is applicable to a shock absorber in which the reinforcing flange is provided at both axial ends of the curved portion 4 and the fixing plates 5.

In the embodiment described above, welding of the curved portion 4 onto the outer shell 2 is performed over the entire circumferential length of the curved portion 4, but it is possible to weld only essential parts of the curved portion 4 onto the outer shell 2, depending on the required strength.

Instead of constituting the insulation part by an arc-shaped cutout 9, it may be constituted by a V-shaped cutout or a simple rectangular slit.

This invention can be applied to either a single shell type shock absorber or a double shell type shock absorber.

The embodiments of this invention in which an exclusive property or privilege is claimed are defined as follows:
1. A strut shock absorber, comprising:
a cylindrical outer shell; and
a knuckle bracket including a curved portion in close contact with the outer shell, the curved portion having, at an axial end thereof,
a reinforcing flange formed by bending a portion of the axial end of the curved portion outward, the reinforcing flange having an inner circumferential surface welded onto the outer shell and an outer circumferential surface having an inflection start point and an inflection end point,
a no-flange portion located adjacent to the reinforcing flange and welded onto the outer shell, an axial distance along an axis of the knuckle bracket from the inflection starting point to the inflection end point being set to be equal to an axial distance from the inflection starting point to the no-flange portion, and an insulation portion located between the reinforcing flange and the no-flange portion, and including a cutout disposed on the axial end of the curved portion between the reinforcing flange and the no-flange portion, the cutout having a portion that starts from the no-flange portion and extends in an axial direction away from the reinforcing flange.

2. The strut shock absorber as defined in claim 1, wherein the depth of the cutout from the no-flange portion is set to be equal to or greater than the axial distance from the inflection starting point to the no-flange portion.

3. The strut shock absorber as defined in claim 1, wherein the knuckle bracket comprises a pair of fixing plates extending from both circumferential ends of the curved portion in a perpendicular direction to the outer shell.

4. The strut shock absorber as defined in claim 3, wherein the curved portion, the pair of fixing plates, and the reinforcing flange are formed integrally by bending a base material in the form of a plate.

5. The strut shock absorber as defined in claim 3, wherein the reinforcing flange is formed at the axial end of the curved portion except for a circumferential region of 180 degrees and located on the opposite side of the pair of fixing plates.

6. The strut shock absorber as defined in claim 5, wherein each of the pair of fixing plates comprises a reinforcing flange formed by bending an axial end of the fixing plate so as to be continuous with the reinforcing flange of the curved portion.

7. The strut shock absorber as defined in claim 1, wherein the axial end of the curved portion corresponds to a lower end thereof in an operational state of the shock absorber.

8. The strut shock absorber as defined in claim 1, wherein the no-flange portion and the inner circumferential surface of the reinforcing flange of the curved portion are fixed by electric-arc welding onto the outer circumferential surface of the outer shell.

9. The strut shock absorber as defined in claim 1, wherein the reinforcing flange and the no-flange portion are located on a common plane perpendicular to the axis of the knuckle bracket.

* * * * *